United States Patent
Zhao

(10) Patent No.: US 10,035,424 B2
(45) Date of Patent: Jul. 31, 2018

(54) BATTERY MANAGEMENT SYSTEM, VEHICLE AND METHOD FOR CONTROLLING MAIN RELAY

(71) Applicant: BORGWARD TRADEMARK HOLDINGS GmbH, Stuttgart (DE)

(72) Inventor: Tianli Zhao, Beijing (CN)

(73) Assignee: BORGWARD TRADEMARK HOLDINGS GMBH, Stuttgart (DE)

( * ) Notice: Subject to any disclaimer, the term of this patent is extended or adjusted under 35 U.S.C. 154(b) by 155 days.

(21) Appl. No.: 15/210,831

(22) Filed: Jul. 14, 2016

(65) Prior Publication Data

US 2017/0158077 A1    Jun. 8, 2017

(30) Foreign Application Priority Data

Dec. 2, 2015 (DE) .................. 10 2015 224 067

(51) Int. Cl.
*B60L 11/18* (2006.01)
*H01M 10/42* (2006.01)

(52) U.S. Cl.
CPC .. *B60L 11/1851* (2013.01); *H01M 2010/4271* (2013.01)

(58) Field of Classification Search
CPC ............... B60L 11/1851; H01M 10/42; H01M 2010/4271
USPC ...................................... 307/10.7
See application file for complete search history.

(56) References Cited

U.S. PATENT DOCUMENTS

| 7,557,460 B2* | 7/2009 | Yugou | B60L 3/0046 307/10.7 |
| 8,049,367 B2* | 11/2011 | Izumi | B60L 11/1868 307/10.7 |
| 2004/0129465 A1* | 7/2004 | Yamaguchi | B60K 6/26 180/65.24 |

(Continued)

FOREIGN PATENT DOCUMENTS

| CN | 100430259 | 11/2008 |
| CN | 2014220096 | 3/2010 |

(Continued)

*Primary Examiner* — Levi Gannon
(74) *Attorney, Agent, or Firm* — Tucker Ellis LLP; Patrick Clunk

(57) ABSTRACT

The invention discloses a battery management system for a vehicle, a vehicle comprising the same and a method for controlling a main relay of the vehicle. The battery management system comprises a main control unit for receiving a main control signal from a vehicle control unit of the vehicle and sending a positive main control signal and a negative main control signal according to the main control signal; an auxiliary signal processing unit for receiving a first auxiliary control signal and a second auxiliary control signal from the vehicle control unit and sending a positive auxiliary control signal and a negative auxiliary control signal according to the first auxiliary control signal and the second auxiliary control signal; and a driving unit for transmitting a positive driving signal to a positive relay of the vehicle according to the positive main control signal and the positive auxiliary control signal, and transmitting a negative driving signal to a negative relay of the vehicle according to the negative main control signal and the negative auxiliary control signal.

7 Claims, 4 Drawing Sheets

(56) References Cited

U.S. PATENT DOCUMENTS

| | | | |
|---|---|---|---|
| 2010/0065349 A1* | 3/2010 | Ichikawa | B60L 3/0046 180/65.1 |
| 2010/0295382 A1* | 11/2010 | Tae | G01R 31/3658 307/150 |
| 2012/0091930 A1* | 4/2012 | Takahashi | B60L 11/1861 318/139 |
| 2012/0283903 A1* | 11/2012 | Kusumi | B60K 6/46 701/22 |
| 2014/0321182 A1* | 10/2014 | Takamatsu | B60L 7/14 363/132 |

FOREIGN PATENT DOCUMENTS

| | | |
|---|---|---|
| CN | 101412378 | 12/2010 |
| CN | 102789224 | 8/2013 |
| CN | 103326425 A | 9/2013 |
| CN | 103358913 A | 10/2013 |
| KR | 2013-10-1315645 | 9/2013 |

\* cited by examiner

BATTERY MANAGEMENT SYSTEM, VEHICLE AND METHOD FOR CONTROLLING MAIN RELAY

RELATED APPLICATIONS

This application claims priority to German Patent Application No. 102015224067.3 filed Dec. 2, 2015, which is hereby incorporated herein by reference.

FIELD OF THE INVENTION

The present invention belongs to the technical field of battery management of electric vehicles and specifically relates to a battery management system for a vehicle, a vehicle comprising the same and a method for controlling a main relay of a vehicle.

BACKGROUND OF THE INVENTION

High-voltage power-up and power-down of an electric vehicle are generally realized in such a manner that a vehicle control unit (VCU) sends power-up and power-down commands to a battery management system (BMS) through a CAN bus of the vehicle. Under a high-speed running condition, when the communication between the VCU and the BMS is abnormal, the BMS is out of control of the VCU, possibly leading to a case of wrongly switching off a main relay of an electric vehicle.

In the prior art, only the VCU can send commands to the BMS through the CAN to control on and off of the main relay of the vehicle. When the vehicle runs at a high speed or under other circumstances that high-voltage power should not be cut off, certain potential safety hazards will be caused in case of wrong operations of the BMS.

SUMMARY OF THE INVENTION

To this end, the present invention provides a battery management system for a vehicle, a vehicle comprising the same and a method for controlling a main relay of a vehicle.

According to a first aspect of the present invention, a battery management system for a vehicle is provided, which comprises a main control unit for receiving a main control signal from a vehicle control unit of the vehicle and sending a positive main control signal and a negative main control signal according to the main control signal; an auxiliary signal processing unit for receiving a first auxiliary control signal and a second auxiliary control signal from the vehicle control unit and sending a positive auxiliary control signal and a negative auxiliary control signal according to the first auxiliary control signal and the second auxiliary control signal; and a driving unit for transmitting a positive driving signal to a positive relay of the vehicle according to the positive main control signal and the positive auxiliary control signal, and transmitting a negative driving signal to a negative relay of the vehicle according to the negative main control signal and the negative auxiliary control signal.

In a first possible embodiment of the first aspect, the driving unit comprises a logic judgment subunit for performing logic judgment on the levels of the positive main control signal and the positive auxiliary control signal and performing logic judgment on the levels of the negative main control signal and the negative auxiliary control signal; and a signal generation subunit for generating the positive driving signal and the negative driving signal according to logic judgment results of the logic judgment subunits.

In combination with the first possible embodiment of the first aspect, in a second possible embodiment, the logic judgment subunit comprises a first OR gate circuit for performing OR judgment on the levels of the positive main control signal and the positive auxiliary control signal; and a second OR gate circuit for performing OR judgment on the levels of the negative main control signal and the negative auxiliary control signal.

In combination with the second possible embodiment of the first aspect, in a third possible embodiment, the signal generation subunit generates the positive driving signal according to a logic judgment result of the first OR gate circuit and generates the negative driving signal according to a logic judgment result of the second OR gate circuit.

In combination with the third possible embodiment of the first aspect, in a fourth possible embodiment, when the main control unit sends a wrong positive main control signal for indicating power-down due to a failure, the auxiliary signal processing unit sends the positive auxiliary control signal for maintaining power-up according to the first auxiliary control signal so that the signal generation subunit generates the positive driving signal for maintaining power-up of the positive relay according to the logic judgment result of the first OR gate circuit; and when the main control unit sends a wrong negative main control signal for indicating power-down due to a failure, the auxiliary signal processing unit sends the negative auxiliary control signal for maintaining power-up according to the second auxiliary control signal so that the signal generation subunit generates the negative driving signal for maintaining power-up of the negative relay according to the logic judgment result of the second OR gate circuit.

According to a second aspect of the present invention, a vehicle is provided, which comprises a power battery; a relay connected between the power battery and a load of power battery; a vehicle control unit for sending control signals; and the battery management system in the first aspect or any one of the first to the fourth possible embodiments of the first aspect for controlling on and off of the relay according to the control signals sent by the vehicle control unit.

According to a third aspect of the present invention, a method for controlling a main relay of a vehicle is provided, which comprises: receiving a main control signal, a first auxiliary control signal and a second auxiliary control signal from a vehicle control unit of the vehicle; sending a positive main control signal and a negative main control signal according to the main control signal; sending a positive auxiliary control signal and a negative auxiliary control signal according to the first auxiliary control signal and the second auxiliary control signal; transmitting a positive driving signal to a positive relay of the vehicle according to the positive main control signal and the positive auxiliary control signal; and transmitting a negative driving signal to a negative relay of the vehicle according to the negative main control signal and the negative auxiliary control signal.

In a first possible embodiment of the third aspect, the transmitting the positive driving signal to the positive relay of the vehicle according to the positive main control signal and the positive auxiliary control signal comprises: performing logic judgment on the levels of the positive main control signal and the positive auxiliary control signal; and generating the positive driving signal according to a result of the logic judgment; and the transmitting the negative driving signal to the negative relay of the vehicle according to the negative main control signal and the negative auxiliary control signal comprises: performing logic judgment on the levels of the negative main control signal and the negative auxiliary control signal; and generating the negative driving signal according to a result of the logic judgment.

In combination with the first possible embodiment of the third aspect, in a second possible embodiment, the logic judgment on the levels of the positive main control signal and the positive auxiliary control signal and the logic judgment on the levels of the negative main control signal and the negative auxiliary control signal are both OR judgments.

In combination with the second possible embodiment of the third aspect, in a third possible embodiment, when the positive main control signal wrongly indicates power-down, the positive auxiliary control signal is still used for maintaining power-up so that the result of the OR judgment on the levels of the positive main control signal and the positive auxiliary control signal is used for generating the positive driving signal for maintaining power-up of the positive relay; and when the negative main control signal wrongly indicates power-down, the negative auxiliary control signal is still used for maintaining power-up so that the result of the OR judgment on the levels of the negative main control signal and the negative auxiliary control signal is used for generating the negative driving signal for maintaining power-up of the negative relay.

According to the technical solutions provided by the present invention, the auxiliary signal processing unit is arranged in the battery management system. In addition to receiving the control signal (the main control signal) from the VCU by the main control unit via the CAN bus, an auxiliary control circuit is designed, which is capable of receiving the auxiliary control signals from the VCU through the auxiliary signal processing unit via other additional cables different from the CAN bus. Hence, when the communication between the VCU and the BMS is abnormal, the BMS is further capable of performing correct on-off operations on the battery in the vehicle by using the auxiliary control signals.

Other features and advantages of the present invention will be described in detail in subsequent section of specific embodiments.

BRIEF DESCRIPTION OF THE DRAWINGS

Accompanying drawings are used for providing further understanding of the present invention and form a part of the specification to explain the present invention together with the specific embodiments below rather than limiting the present invention. In the accompanying drawings.

DETAILED DESCRIPTION OF THE EMBODIMENTS

The specific embodiments of the present invention are described in detail below in combination with the accompanying drawings. It should be understood that the specific embodiments described herein are merely used for explaining and interpreting the present invention rather than limiting the present invention.

Figure 1:
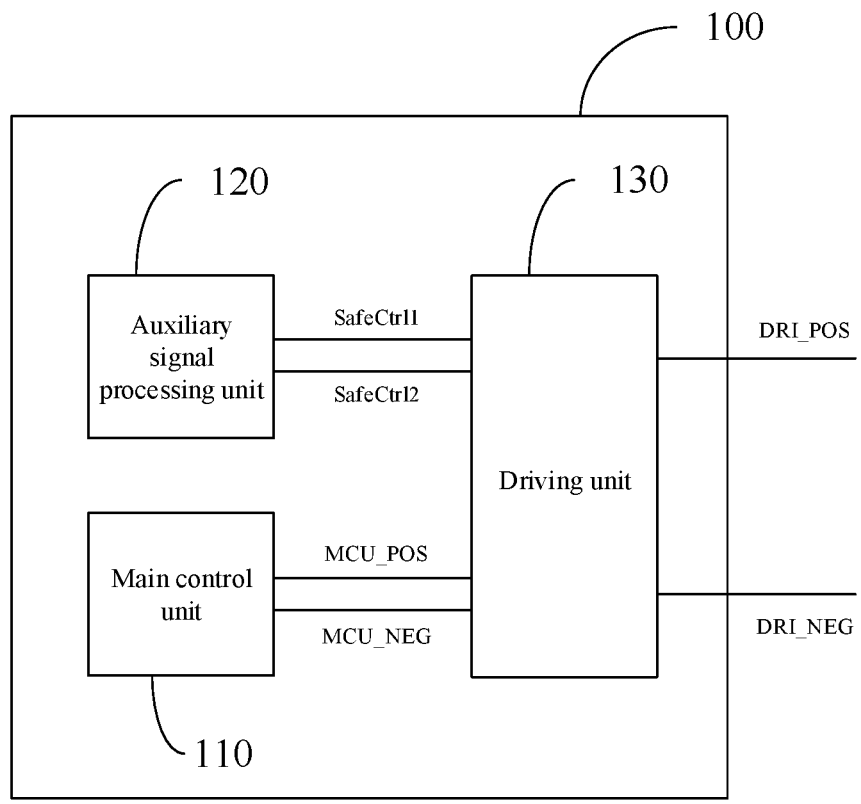
FIG. 1 shows a block diagram of a battery management system according to one embodiment of the present invention.

The battery management system 100 shown in FIG. 1 comprises a main control unit 110, an auxiliary signal processing unit 120 and a driving unit 130. The main control unit 110 is capable of receiving a main control signal from the vehicle control unit (VCU) of the vehicle and sending a positive main control signal MCU_POS and a negative main control signal MCU_NEG to the driving unit 130 according to the received main control signal. The auxiliary signal processing unit 120 is capable of receiving a first auxiliary control signal and a second auxiliary control signal from the VCU and sending a positive auxiliary control signal SafeCtrl1 and a negative auxiliary control signal SafeCtrl2 to the driving unit 130 according to the first auxiliary control signal and the second auxiliary control signal. The driving unit 130 is capable of transmitting a positive driving signal DRI_POS to a positive relay of the vehicle according to the positive main control signal received from the main control unit 110 and the positive auxiliary control signal received from the auxiliary signal processing unit 120, and transmitting a negative driving signal DRI_NEG to a negative relay of the vehicle according to the negative main control signal received from the main control unit 110 and the negative auxiliary control signal received from the auxiliary signal processing unit 120.

Thus, the auxiliary signal processing unit is arranged in the battery management system. In addition to receiving the control signal (the main control signal) from the VCU by the main control unit via the CAN bus, an auxiliary control circuit is designed, which is capable of receiving the auxiliary control signals from the VCU through the auxiliary signal processing unit via other additional cables different from the CAN bus. Hence, when the communication between the VCU and the BMS is abnormal, the BMS is further capable of performing correct on-off operations on the main relay in the vehicle by using the auxiliary control signals.

Besides, the auxiliary signal processing unit receives the first auxiliary control signal and the second auxiliary control signal from the VCU; the two auxiliary control signals are divided into two branches for assisting in controlling the positive relay and the negative relay, respectively. Such control is relatively flexible, and the positive relay and negative relay can be controlled simultaneously or controlled in a time division manner. The two signals can be effective at a high level or at a low level simultaneously, or one signal is effective at the high level, while the other one is effective at the low level. When the effective levels of the two signals are different, the wrong operations on the main relay can be prevented under abnormal circumstances of the vehicle such as CPU resetting, wiring harness loosening or the like.

Figure 2:
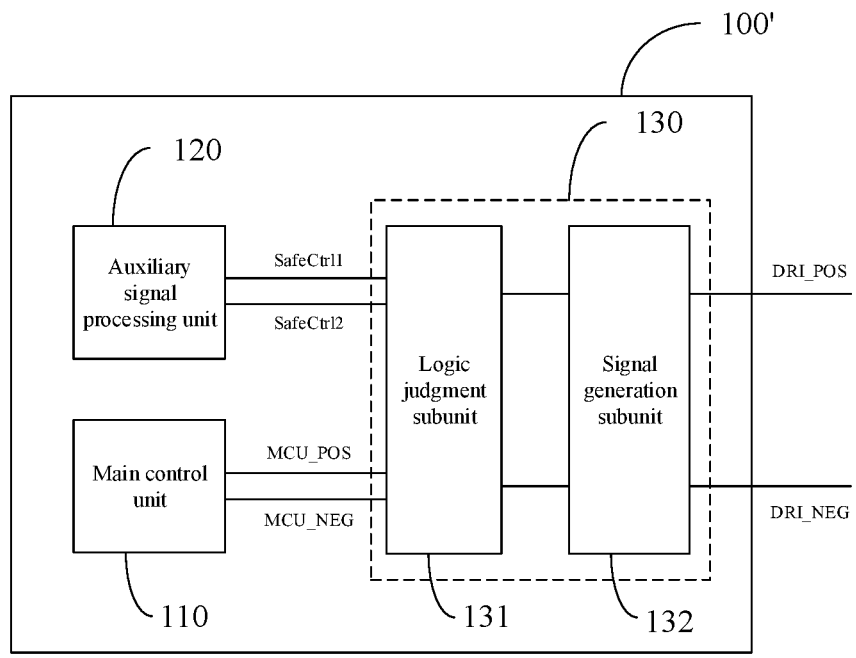
FIG. 2 shows a block diagram of a battery management system according to another embodiment of the present invention.

As shown in FIG. 2, the driving unit 130 may comprise a logic judgment subunit 131 and a signal generation subunit 132. In brief, only the differences of the embodiment shown in FIG. 2 from that of FIG. 1 are described in detail below, while the similarities therebetween are not described redundantly herein.

The logic judgment subunit 131 is capable of performing logic judgment on the levels of the positive main control signal MCU_POS received from the main control unit 110 and the positive auxiliary control signal SafeCtrl1 received from the auxiliary signal processing unit 120, and performing logic judgment on the levels of the negative main control signal MCU_NEG received from the main control unit 110 and the negative auxiliary control2 signal SafeCtrl2 received from the auxiliary signal processing unit 120. According to logic judgment results of the logic judgment subunits 131, the signal generation subunit 132 is capable of generating the positive driving signal DRI_POS and the negative driving signal DRI_NEG transmitted to the positive relay and the negative relay, respectively.

Figure 3:
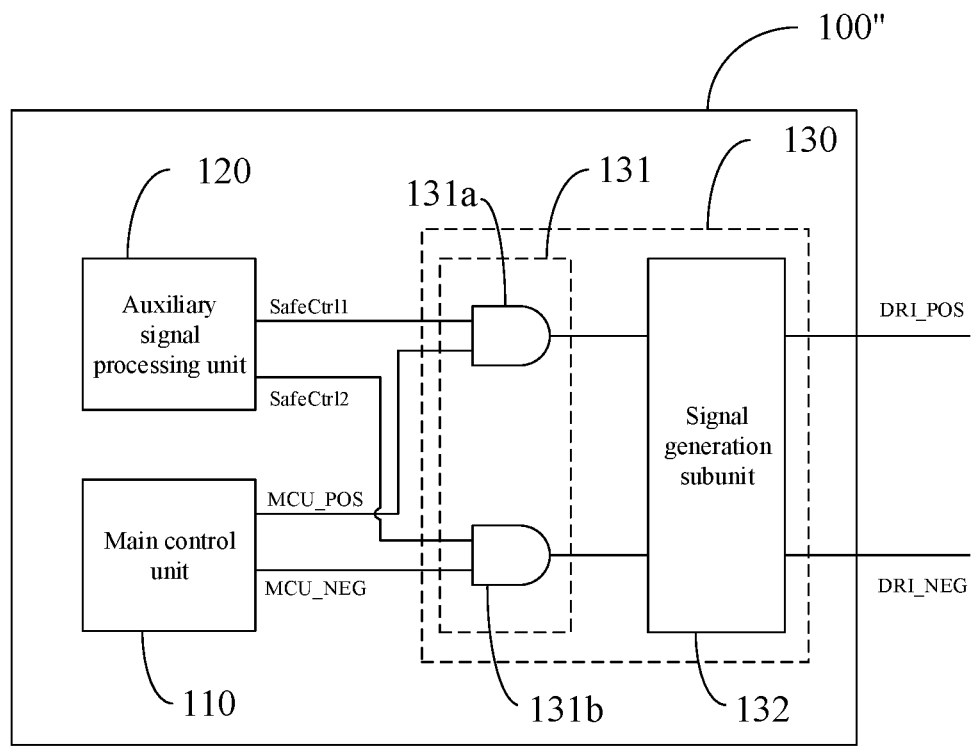
FIG. 3 shows a block diagram of a battery management system according to another embodiment of the present invention.

As shown in FIG. 3, the logic judgment subunit 131 may comprise a first OR gate circuit 131a and a second OR gate circuit 131b. In brief, only the differences of the embodiment shown in FIG. 3 from that of FIG. 2 are described in detail below, while the similarities therebetween are not described redundantly herein.

The first OR gate circuit 131a is capable of performing OR judgment on the levels of the positive main control signal MCU_POS received from the main control unit 110 and the positive auxiliary control signal SafeCtrl1 received from the auxiliary signal processing unit 120. Similarly, the second OR gate circuit 131b is capable of performing OR judgment on the levels of the negative main control signal MCU_NEG received from the main control unit 110 and the negative auxiliary control signal SafeCtrl2 received from the auxiliary signal processing unit 120.

According to one embodiment of the present invention, the signal generation subunit 132 is capable of generating the positive driving signal DRI_POS transmitted to the positive relay according to a logic judgment result of the first OR gate circuit 131a and generating the negative driving signal DRI_NEG transmitted to the negative relay according to a logic judgment result of the second OR gate circuit 131b.

According to one embodiment of the present invention, when the main control unit 110 sends the wrong positive main control signal for indicating power-down due to a failure, the auxiliary signal processing unit 120 is still capable of sending the positive auxiliary control signal for maintaining power-up according to the first auxiliary control signal so that the signal generation subunit 132 is capable of generating the positive driving signal for maintaining power-up of the positive relay according to the logic judgment result of the first OR gate circuit 131a. On the other hand, when the main control unit 110 sends the wrong negative main control signal for indicating power-down due to a failure, the auxiliary signal processing unit 120 is still capable of sending the negative auxiliary control signal for maintaining power-up according to the second auxiliary control signal so that the signal generation subunit 132 is capable of generating the negative driving signal for maintaining power-up of the negative relay according to the logic judgment result of the second OR gate circuit 131b.

Thus, when the communication between the VCU and the BMS is abnormal, the main control unit may send a wrong power-down signal, the BMS is still capable of performing correct operations on the main relay by using the auxiliary control signals to maintain the power-up state of the main relay when the vehicle is running. Hence, wrong operations can be effectively prevented.

Figure 4:
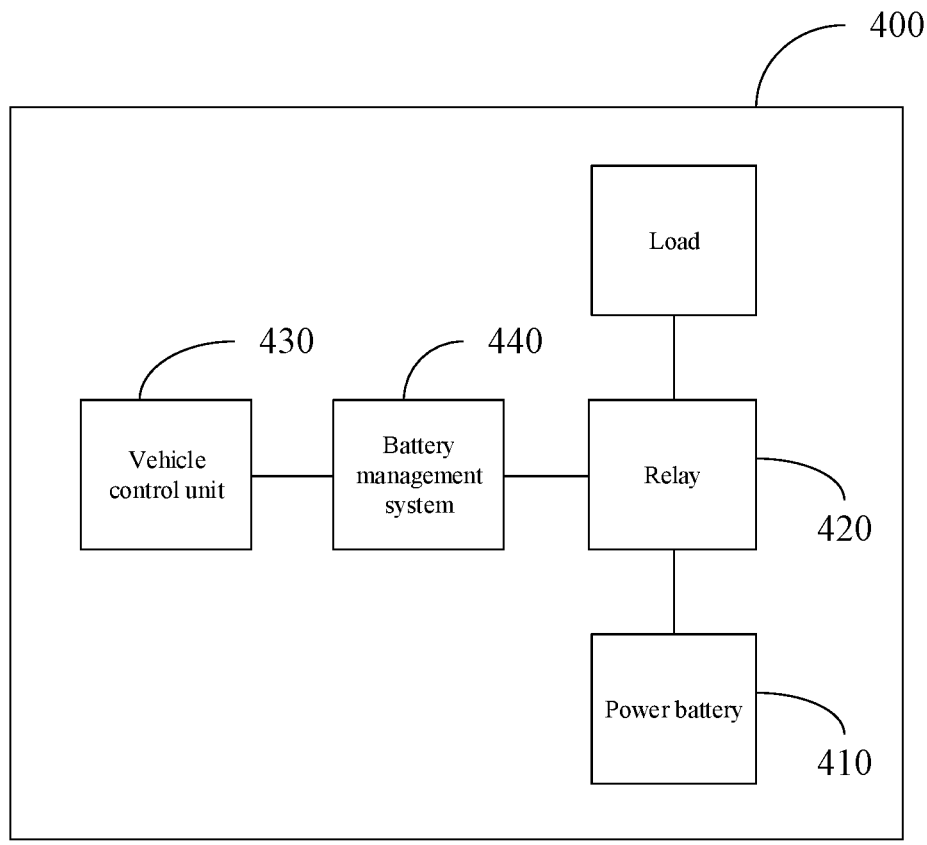
FIG. 4 shows a schematic block diagram of a vehicle according to one embodiment of the present invention.

As shown in FIG. 4, the vehicle 400 may comprise a power battery 410, a relay 420, a vehicle control unit (VCU) 430 and a battery management system (BMS) 440. The relay 420 can be connected between the power battery 410 and a load of power battery. The vehicle control unit 430 can be used for sending control signals to the battery management system 440. The battery management system 440 can be the battery management system of any one of the above-mentioned embodiments and is capable of controlling on and off of the relay 420 according to the control signals sent by the vehicle control unit 430.

According to one embodiment of the present invention, the control signals sent by the vehicle control unit 430 may include a main control signal, a first auxiliary control signal and a second auxiliary control signal.

Figure 5:
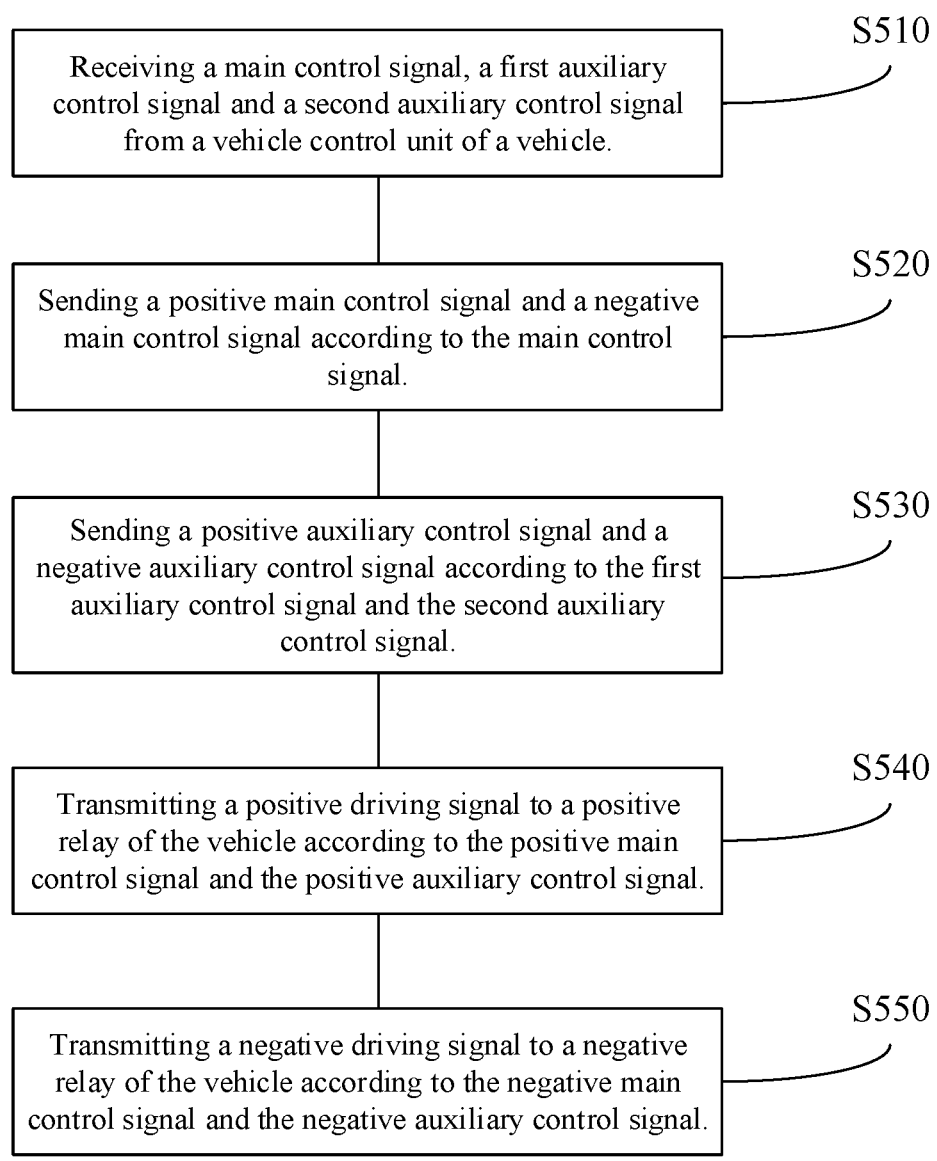
FIG. 5 shows a flow diagram of a method for controlling a main relay of a vehicle according to one embodiment of the present invention.

As shown in FIG. 5, the method 500 may comprise steps S510 to S550. In the step S510, the main control signal, the first auxiliary control signal and the second auxiliary control signal are received from the vehicle control unit of the vehicle. Subsequently, in the step S520, a positive main control signal and a negative main control signal are sent according to the main control signal; and in the step S530, a positive auxiliary control signal and a negative auxiliary control signal are sent according to the first auxiliary control signal and the second auxiliary control signal. Next, in the step S540, a positive driving signal is transmitted to a positive relay of the vehicle according to the positive main control signal and the positive auxiliary control signal; and in the step S550, a negative driving signal is transmitted to a negative relay of the vehicle according to the negative main control signal and the negative auxiliary control signal.

Understandably, in the embodiment shown in FIG. 5, the steps S520 and S530 can be exchanged in order, or carried out simultaneously. Similarly, the steps S540 and S550 can be exchanged in order, or carried out simultaneously.

Figure 6:
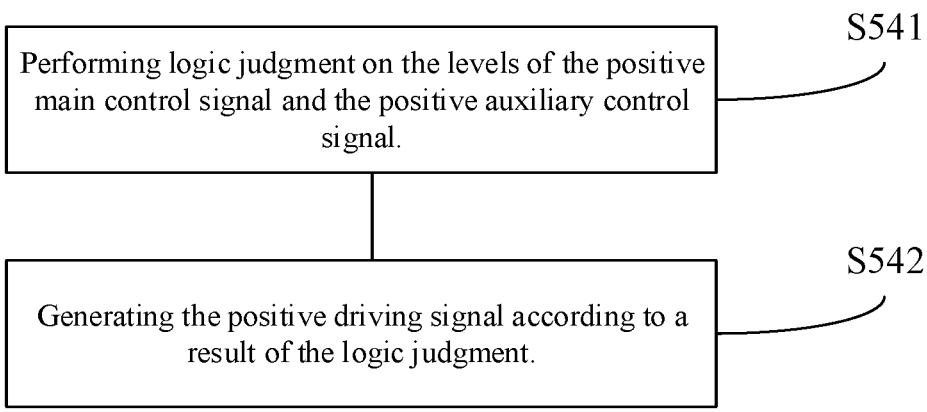
FIG. 6 shows a flow diagram of sending a positive driving signal to a positive relay of a vehicle according to a positive main control signal and a positive auxiliary control signal.

As shown in FIG. 6, the step S540 may comprise substeps S541 and S542. In the substep S541, logic judgment is performed on the levels of the positive main control signal and the positive auxiliary control signal. Subsequently, in the substep S542, the positive driving signal is generated according to a result of the logic judgment.

Figure 7:
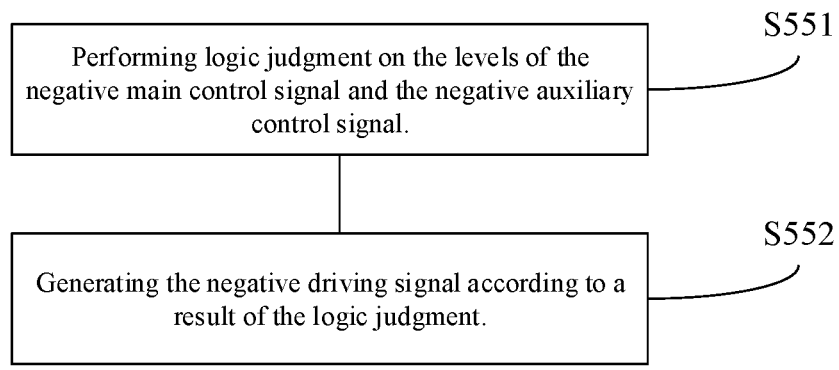
FIG. 7 shows a flow diagram of sending a negative driving signal to a negative relay of a vehicle according to a negative main control signal and a negative auxiliary control signal.

As shown in FIG. 7, the step S550 may comprise substeps S551 and S552. In the substep S551, logic judgment is performed on the levels of the negative main control signal and the negative auxiliary control signal. Subsequently, in the substep S552, the negative driving signal is generated according to a result of the logic judgment.

According to one embodiment of the present invention, the logic judgment on the levels of the positive main control signal and the positive auxiliary control signal and the logic judgment on the levels of the negative main control signal and the negative auxiliary control signal are both OR judgments.

According to one embodiment of the present invention, when the positive main control signal wrongly indicates power-down, the positive auxiliary control signal is still used for maintaining power-up so that the result of the OR judgment on the levels of the positive main control signal and the positive auxiliary control signal can be used for generating the positive driving signal for maintaining power-up of the positive relay. On the other hand, when the negative main control signal wrongly indicates power-down, the negative auxiliary control signal is still used for maintaining power-up so that the result of the OR judgment on the levels of the negative main control signal and the negative auxiliary control signal can be used for generating the negative driving signal for maintaining power-up of the negative relay.

The preferred embodiments of the present invention are described above in detail in conjunction with the accompanying drawings. However, the present invention is not limited to specific details in the embodiments. A plurality of simple variations can be made to the technical solutions of the present invention within the technical conception of the present invention. These simple variations all fall into the protection scope of the present invention.

Additionally, it needs to be noted that various specific technical features described in the specific embodiments above can be combined in any appropriate way without contradiction. In order to avoid needless repetition, various possible combination ways are not described separately in the present invention.

Besides, various different embodiments of the present invention also can be combined arbitrarily, and the combinations should also be considered as disclosure of the present invention as long as they do not depart from the ideas of the present invention.

The invention claimed is:

1. A battery management system for a vehicle, comprising:
   a main control unit for receiving a main control signal from a vehicle control unit of the vehicle and sending a positive main control signal and a negative main control signal according to the main control signal;
   an auxiliary signal processing unit for receiving a first auxiliary control signal and a second auxiliary control signal from the vehicle control unit and sending a positive auxiliary control signal and a negative auxiliary control signal according to the first auxiliary control signal and the second auxiliary control signal; and
   a driving unit for transmitting a positive driving signal to a positive relay of the vehicle according to the positive main control signal and the positive auxiliary control signal, and transmitting a negative driving signal to a negative relay of the vehicle according to the negative main control signal and the negative auxiliary control signal, wherein the driving unit comprises:
      a logic judgment subunit comprising a first OR gate circuit for performing OR judgment on the levels of the positive main control signal and the positive auxiliary control signal; and a second OR gate circuit for performing OR judgment on the levels of the negative main control signal and the negative auxiliary control signal; and
      a signal generation subunit for generating the positive driving signal and the negative driving signal according to logic judgment results of the logic judgment subunit.

2. The battery management system according to claim 1, wherein the signal generation subunit generates the positive driving signal according to a logic judgment result of the first OR gate circuit and generates the negative driving signal according to a logic judgment result of the second OR gate circuit.

3. The battery management system according to claim 2, wherein
   when the main control unit sends a wrong positive main control signal for indicating power-down due to a failure, the auxiliary signal processing unit sends the positive auxiliary control signal for maintaining power-up according to the first auxiliary control signal so that the signal generation subunit generates the positive driving signal for maintaining power-up of the positive relay according to the logic judgment result of the first OR gate circuit; and
   when the main control unit sends a wrong negative main control signal for indicating power-down due to a failure, the auxiliary signal processing unit sends the negative auxiliary control signal for maintaining power-up according to the second auxiliary control signal so that the signal generation subunit generates the negative driving signal for maintaining power-up of the negative relay according to the logic judgment result of the second OR gate circuit.

4. A vehicle, comprising:
   a power battery;
   a relay connected between the power battery and a load of power battery;
   a vehicle control unit for sending control signals; and
   a battery management system for controlling on and off of the relay according to the control signals sent by the vehicle control unit, wherein the battery management system comprising:
      a main control unit for receiving a main control signal from the vehicle control unit of the vehicle and sending a positive main control signal and a negative main control signal according to the main control signal;
      an auxiliary signal processing unit for receiving a first auxiliary control signal and a second auxiliary control signal from the vehicle control unit and sending a positive auxiliary control signal and a negative auxiliary control signal according to the first auxiliary control signal and the second auxiliary control signal; and
      a driving unit for transmitting a positive driving signal to a positive relay of the vehicle according to the positive main control signal and the positive auxiliary control signal, and transmitting a negative driving signal to a negative relay of the vehicle according to the negative main control signal and the negative auxiliary control signal, wherein the driving unit comprises:
         a logic judgment subunit comprising a first OR gate circuit for performing OR judgment on the levels of the positive main control signal and the positive auxiliary control signal; and a second OR gate circuit for performing OR judgment on the levels of the negative main control signal and the negative auxiliary control signal; and
         a signal generation subunit for generating the positive driving signal and the negative driving signal according to logic judgment results of the logic judgment subunit.

5. The vehicle according to claim 4, wherein the signal generation subunit generates the positive driving signal according to a logic judgment result of the first OR gate circuit and generates the negative driving signal according to a logic judgment result of the second OR gate circuit.

6. The vehicle according to claim 5, wherein
   when the main control unit sends a wrong positive main control signal for indicating power-down due to a failure, the auxiliary signal processing unit sends the positive auxiliary control signal for maintaining power-up according to the first auxiliary control signal so that the signal generation subunit generates the positive driving signal for maintaining power-up of the positive relay according to the logic judgment result of the first OR gate circuit; and when the main control unit sends a wrong negative main control signal for indicating power-down due to a failure, the auxiliary signal processing unit sends the negative auxiliary control signal for maintaining power-up according to the second auxiliary control signal so that the signal generation subunit generates the negative driving signal for maintaining power-up of the negative relay according to the logic judgment result of the second OR gate circuit.

7. A method for controlling a main relay of a vehicle, comprising:

receiving a main control signal, a first auxiliary control signal and a second auxiliary control signal from a vehicle control unit of the vehicle;

sending a positive main control signal and a negative main control signal according to the main control signal;

sending a positive auxiliary control signal and a negative auxiliary control signal according to the first auxiliary control signal and the second auxiliary control signal;

transmitting a positive driving signal to a positive relay of the vehicle according to the positive main control signal and the positive auxiliary control signal; and transmitting a negative driving signal to a negative relay of the vehicle according to the negative main control signal and the negative auxiliary control signal, wherein the transmitting the positive driving signal to the positive relay of the vehicle according to the positive main control signal and the positive auxiliary control signal comprises:

performing OR logic judgment on the levels of the positive main control signal and the positive auxiliary control signal; and generating the positive driving signal according to a result of the OR logic judgment;

and the transmitting the negative driving signal to the negative relay of the vehicle according to the negative main control signal and the negative auxiliary control signal comprises:

performing OR logic judgment on the levels of the negative main control signal and the negative auxiliary control signal; and generating the negative driving signal according to a result of the OR logic judgment;

wherein, when the positive main control signal wrongly indicates power-down, the positive auxiliary control signal is still used for maintaining power-up so that the result of the OR judgment on the levels of the positive main control signal and the positive auxiliary control signal is used for generating the positive driving signal for maintaining power-up of the positive relay; and when the negative main control signal wrongly indicates power-down, the negative auxiliary control signal is still used for maintaining power-up so that the result of the OR judgment on the levels of the negative main control signal and the negative auxiliary control signal is used for generating the negative driving signal for maintaining power-up of the negative relay.

* * * * *